United States Patent Office 3,577,354
Patented May 4, 1971

3,577,354
MAGNESIUM CHROMIUM FERRITE CATALYST
William L. Kehl, Indiana Township, Allegheny County, Pa., assignor to Gulf Research & Development Company, Pittsburgh, Pa.
No Drawing. Division and continuation-in-part of application Ser. No. 493,222, Oct. 5, 1965. This application June 27, 1969, Ser. No. 837,376
Int. Cl. B01j *11/06, 11/32*
U.S. Cl. 252—468          13 Claims

ABSTRACT OF THE DISCLOSURE

A hydrocarbon conversion catalyst comprising magnesium, chromium, iron and oxygen in a magnesium chromium ferrite spinel-type structure.

---

This application is a division and continuation-in-part of United States patent application Ser. No. 493,222 filed Oct. 5, 1965, now abandoned.

The present invention relates to catalysts useful in the conversion and treatment of hydrocarbons, and more particularly it relates to magnesium chromium ferrites of a spinel-type structure and having a surface area of catalytic magnitude.

Spinel is magnesium aluminate, $MgAl_2O_4$, of distinct crystalline structure. Many other materials having the general formula $AB_2O_4$, in which A is a divalent metal cation and B is a trivalent metal cation possess the spinel-like crystalline structure. For example, magnesium ferrite, $MgFe_2O_4$, is a spinel-like material. When so formed that it possesses a surface area of catalytic magnitude and when used for the catalytic conversion of hydrocarbons, it is found to reduce quite easily to a low state of oxidation, in which form it exhibits significantly reduced selectivity for the desired catalyzed reaction.

I have discovered that a spinel-type material made from magnesium, chromium and iron as the active components thereof and having a surface area of catalytic magnitude possesses excellent as well as unexpected catalytic activity for the conversion of hydrocarbons with excellent stability against decrease in conversion and activity over long periods of use. For example, the magnesium chromium ferrite catalyst of this invention can be used continuously, without the frequent need for regeneration, in the oxydehydrogenation of butenes to butadiene. The catalyst of this invention can have the cations contained in a single phase spinel-type compound, that is a homogeneous magnesium chromium ferrite, or as a heterogeneous composition containing a mixture of one or more of the oxides of said cations as well as the single phase, three cation spinel compound.

The catalyst of the present invention can be represented by the empirical formula $Mg_xCr_yFe_zO_4$ wherein $x$ can vary within the range of from about 0.1 to about 3, $y$ can vary from greater than 0 to less than 2 and $z$ can vary from greater than 0 to less than 3. In a preferred form of the catalyst $x$ can vary within the range of about 0.1 to about 2.0, $y$ can vary from about 1.0 to about 1.8 and $z$ can vary from about 0.25 to about 1.9 while in a more preferred form $x$ can vary from about 0.8 to about 1.3, $y$ can vary from about 0.2 to about 1.5 and $z$ can vary from aobut 0.5 to about 1.8. In the most preferred form of the catalyst $x$ is about 1.0. In this empirical formula $x$, $y$ and $z$ are normalized to fit the valence requirements of four oxygen atoms.

In the normal spinel structure the oxygen atoms are arranged on a face-centered cubic close-packed lattice with the divalent atoms being surrounded with tetrahedral groups of four oxygen atoms and the trivalent atoms being surrounded by octahedral groups of six oxygen atoms. Deviations from this normal structure can occur as a result of variations in the atomic sizes, ionic forces, site preference stabilization energies, and the like. These deviations can result in disorder, distortion, or irregularity in the spinel lattice and can involve a distribution of the divalent and trivalent cations in the tetrahedral and octahedral sites different from the ideal spinel structure. These deviations result in deformation and straining of the lattice which in turn cause localized unbalanced charge distributions in the crystal. It is my belief that my novel combination of magnesium, chromium and iron in the spinel-type structure causes deviations, in general, of the type described which are responsible for the unexpectedly enhanced catalytic activity and stability.

In the homogeneous structure, all of the elements are located in a single phase magnesium chromium ferrite compound. In the ideal homogeneous structure magnesium occupies both tetrahedral and octahedral sites because it possesses an octahedral site stabilization energy greater than the octahedral site stabilization energy of iron but less than that of chromium. Therefore, $x$ is 1.0 and the sum of $x+y+z$ is 3.0 in this ideal structure. When magnesium enters octahedral sites in the ideal structure, a corresponding amount of iron will occupy tetrahedral sites so that the overall charge balance is maintained. In view of this, in the actual homogeneous magnesium chromium ferrite $x$ is about 1.0, the sum of $y+z$ is about 2.0, and the sum of $x+y+z$ is about 3.0.

In the heterogeneous composition, also represented by the empirical formula $Mg_xCr_yFe_zO_4$, the single phase magnesium chromium ferrite compound will be present as well as one or more oxides or combined oxides of one or more of the constituent cations. For example, if $x$ is about 3 in the empirical formula for the composition, the catalyst will contain a major amount of magnesium oxide and a minor amount of a magnesium chromium ferrite compound. In this instance the composition will possess desired catalytic activity due to the presence of the magnesium chromium ferrite compound. The magnesium oxide may have a minor effect depending on the reactants and/or conditions. When $x$ in the empirical formula is significantly less than 1.0, for example 0.5, the catalytic material will consist of a mixture of magnesium chromium ferrite compound and chromium and/or iron oxides. Chromium and/or iron oxides, when present, may not be inert, i.e. they can have some activity with lower selectivity for the desired reaction, thereby somewhat reducing the high conversions and selectivity obtained when using the homogeneous magnesium chromium ferrite catalyst.

The magnesium chromium ferrites can be conveniently prepared by employing as starting materials salts of magnesium, chromium and iron, in which salts the metals are contained as cations. Any such salt of said metals is satisfactory, however, it is preferred to employ inorganic salts of the metals, such as, for example, nitrates, carbonates, acetates and halides. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion in the precursor, and thus in the final product, of any contaminant it is essential that either a volatilizable base or a base containing no deleterious contaminants such as, for example, sodium, be employed. Any base which can be vaporized readily under the conditions used for drying and calcining can be employed, such as, for example, ammonium carbonate, ammonium bicarbonate and ammonium hydroxide. It is considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about four to about 60 hours while calcining can be effected at temperatures ranging from about 350° C. to about 800° C. for a period of from about two to 16 hours.

It has been found that the catalysts of the present invention can be conveniently prepared by forming aqueous solutions of salts of the respective cations, magnesium, chromium and iron, preferably the nitrate salts thereof, and admixing said solutions with an aqueous ammonium hydroxide solution at a pH above about 8, preferably between a pH of from about 8.5 to about 8.9, thereby coprecipitating the hydroxides of the cations. The resulting precipitate can then be washed, filtered, dried and calcined to yield the finished bulk catalyst.

The catalyst can be employed with or without a filler or carrier material and can be pelletized or formed employing conventional techniques. Suitable carrier materials are, for example, rough granular aluminas, zirconias, granular silicon carbide and other similar inert materials. Supported catalyst can be prepared by thoroughly mixing the granular particles of the carrier material with a thick wet slurry of the washed mixture of combined precipitates prior to drying and calcining. The slurried mixture can thereafter be dried at about 120° C. and calcined at about 650° C. to provide granular particles of the supported catalyst. The unsupported catalyst, in general, has been found to be more satisfactory particularly from the aspect of catalyst life.

In order that this magnesium chromium ferrite composition possess catalytic activity for the conversion of hydrocarbons it is essential that it be formulated with a significant surface area, that is, a surface area of at least about 0.1 to about 0.5 m.$^2$/g. and preferably a surface area of at least about 1.0 m.$^2$/g. For example, in the oxydehydrogenation of butene-1 to form butadiene, a surface area of about 5 m.$^2$/g. has bee found to be satisfactory. In using a surface area significantly higher than this it has been found that it is more difficult to extract the heat evolved in this highly exothermic reaction. For some uses a surface area of at least about 10 m.$^2$/g. is preferred. In making the unsupported magnesium chromium ferrite material, a surface area of about 30 to about 50 m.$^2$/g. can be produced. If a finished catalyst of lower surface area is desired, this material is sintered under controlled conditions to reduce the surface area to a desired level. The supported magnesium chromium ferrite can be produced with a higher surface area than the supported material, if desired, with the resulting supported surface area being a function of the surface area of the support.

We now describe by way of specific examples the use of our invention, however, these examples are not to be construed in any manner as limiting our invention.

EXAMPLE 1

A solution was prepared containing 51.2 grams $Mg(NO)_2 \cdot 6H_2O$, 80.8 grams $Fe(NO_3)_3 \cdot 9H_2O$ and 80.0 grams $Cr(NO_3)_3 \cdot 9H_2O$ in 1,000 cc. of distilled water. This solution was added with vigorous stirring to a dilute solution of ammonium hydroxide together with sufficient additional dilute ammonium hydroxide to maintain the pH at 8.5 to 9.0. After the reaction was completed, the precipitate was allowed to settle and was separated by decantation. Analysis of the decanted liquid showed no magnesium ions, indicating that the precipitation of the magnesium was complete. The precipitate was washed, dried and calcined at 650° C. for eight hours. The calcined product was determined to be magnesium chromium ferrite of the formula $MgCrFeO_4$. It was found to possess a well ordered spinel structure by X-ray diffraction analysis. There was no indication of the presence of any metal oxide such as magnesium oxide, iron oxide or chromium oxide.

The characteristic X-ray diffraction pattern for this magnesium chromium ferrite spinel-type material having the empirical formula of about $MgCrFeO_4$ consists of lines with the following "$d$" spacings and relative intensities.

| $d$ (A): | $I/I_o$ |
|---|---|
| 4.84 | 10 |
| 2.99 | 35 |
| 2.54 | 100 |
| 2.43 | 10 |
| 2.10 | 20 |
| 1.72 | 12 |
| 1.62 | 30 |
| 1.49 | 40 |

The relative intensities and the width or sharpness of the lines in the patterns from these compounds will vary with changes in the relative concentrations of the cations in the structure. Inhomogeneity in the catalyst compositions is manifested by additional or doubled lines in the pattern.

A stream of butene-1 admixed with steam and oxygen in a mol ratio of steam to butene-1 of 10 to 1 and of butene-1 to oxygen of 1.5 to 1 was passed over this catalyst at a gas hourly space velocity of 900 based on the butene-1 and at a temperature of 325° C. A 76 percent conversion of the butene-1 resulted with a selectivity of 91 percent and yield of 69 percent to butadiene. This reaction can be carried out for long periods of time without sufficient loss in activity or selectivity to require regeneration. When regeneration is required, the catalyst is calcined in air at 500° C. to 650° C.

EXAMPLE 2

A solution of 102.6 grams of $Mg(NO_3)_2 \cdot 6H_2O$, 160 grams of $Cr(NO_3)_3 \cdot 9H_2O$ and 161.6 grams of $Fe(NO_3)_3 \cdot 9H_2O$ in 1000 cc. of water was precipitated with ammonium hydroxide at a pH of 10.5 in the manner described in the preceding example. The washed and dried precipitate was calcined at 650° C. for 16 hours. It was determined to be magnesium chromium ferrite of the formula $MgCrFeO_4$ having a surface area of 36 m.$^2$/g. X-ray diffraction analysis indicated the presence only of the spinel-type magnesium chromium ferrite.

EXAMPLE 3

A mixture of 181.8 grams of $Fe(NO_3)_3 \cdot 9H_2O$, 60.0 grams of $Cr(NO_3)_3 \cdot 9H_2O$ and 76.9 grams of $Mg(NO_3)_2 \cdot 6H_2O$ in 1000 cc. of water was added with stirring to a solution containing 200 grams of ammonium bicarbonate. A dilute solution of ammonium hydroxide was concurrently added to the ammonium bicarbonate solution to maintain the pH between 8.0 and 8.6. The precipitate was filtered, washed, dried and calcined at 650° C. for 16 hours. It was determined that the freshly calcined product was a well-ordered spinel of the empirical composition $MgCr_{.5}Fe_{1.5}O_4$. X-ray diffraction analysis of this freshly calcined product indicated that there was a few percent of $\alpha\text{-}Fe_2O_3$ intermixed with the magnesium chromium ferrite spinel.

This catalyst was used in the conversion of butene-1 to butadiene using a steam to butene-1 mol ratio of 10 to 1 and a 1 to 1 mol ratio of butene-1 to oxygen at a temperature of 325° C. and a flow rate of butene-1 of 30 cc. per minute. This reaction resulted in a conversion of 72 percent with a selectivity of 84 percent and yield of 60 percent to butadiene. After several runs the catalyst was again analyzed by X-ray diffraction analysis and the magnesium chromium ferrite spinel was the only composition present indicating that the small amount of α-ferric oxide was incorporated into the spinel structure during the reaction.

EXAMPLE 4

A second sample of a magnesium chromium ferrite spinel having an empirical composition of $MgCr_{.5}Fe_{1.5}O_4$ was prepared in a manner similar to that described in Example 3 except that an ammonium hydroxide solution was used in both instances at a pH of 10.5. The surface area of the calcined product was 17 m.²/g. and the X-ray diffraction pattern indicated the presence only of the well-formed spinel compound.

EXAMPLE 5

A mixture of 8.2 grams of $CrCl_3 \cdot 6H_2O$, 25.1 grams of $MgCl_2 \cdot 6H_2O$ and 58.2 grams of $FeCl_3 \cdot 6H_2O$ in 1000 cc. of water was precipitated at a pH of 10 to 10.5. The precipitate was separated by decantation, washed, dried and calcined at 500° C. for 16 hours. Analysis of the material indicated a spinel-type compound of the formula $MgCr_{.25}Fe_{1.75}O_4$ and a small amount of α-ferric oxide. Its surface area was found to be 63 m.²/g.

EXAMPLE 6

A mixture of 51.3 grams of $Mg(NO_3)_2 \cdot 6H_2O$, 20.0 grams of $Cr(NO_3)_3 \cdot 9H_2O$ and 141.4 grams of $Fe(NO_3)_3 \cdot 9H_2O$ were ground together. Water was then slowly added as grinding continued until a fluid paste was obtained. After completion of grinding, the paste was dried by gentle heating in an evaporating disk. The dry product was again ground and then heated at 650° C. for several hours. The product was cooled and once more ground together. The resulting powder was pressed into one inch by 1/16 inch wafers at a pressure of 6000 p.s.i. and the wafers calcined at 650° C. for 16 hours. Analysis of the calcined product indicated a well-formed spinel compound of the formula $MgCr_{.25}Fe_{1.75}O_4$ containing a small amount of α-ferric oxide.

EXAMPLE 7

A solution of 51.3 grams of $Mg(NO_3)_2 \cdot 6H_2O$, 120.0 grams $Cr(NO_3)_3 \cdot 9H_2O$ and 40.4 grams $Fe(NO_3)_3 \cdot 9H_2O$ in 500 cc. of water was precipitated in the same manner as described in Example 1 at a pH of 10.5. The washed and dried precipitate was calcined at 650° C. for 16 hours. Analysis indicated a well formed spinel-type compound of the formula $MgCr_{1.5}Fe_{.5}O_4$ with no free oxides of the metals present. A second similarly prepared composition of the same formula was determined to have a surface area of 32 m.²/g.

As indicated above, the octahedral site preference energy of chromium is the highest and iron the lowest with magnesium in between. For this reason a substantial amount of the iron is found in tetrahedral sites in the spinel structure. The fraction of the tetrahedral sites occupied by iron should theoretically remain constant as the amount of chromium is increased until the total iron concentration in the compound becomes less than that required to fill these sites. Notwithstanding this expected result, it has been unexpectedly discovered that the amount of iron in tetrahedral sites decreases as the chromium content increases even when there is sufficient iron to fill the tetrahedral sites. This suggests that there is an interaction between the chromium and iron cations and that the unusal catalytic activity of the magnesium chromium ferrite spinels is related to this characteristic.

The catalysts as described herein can also be used for the oxydehydrogenation of aldehydes and ketones at good conversions and excellent selectivities. For example, isobutyraldehyde is converted to methacrolein, methyl ethyl ketone is converted to methyl vinyl ketone, etc. Additionally, it has been unexpectedly discovered that these magnesium chromium ferrite catalytic materials catalyze the isomerization of butene-2 to butene-1 in a substantially oxygen-free environment. Also the magnesium chromium ferrite catalyst is active for cracking hydrocarbons such as the cracking of 2,4-dimethylpentane.

It is to be understood that the above disclosure is by way of specific example and that numerous modifications and variations are available to those of ordinary skill in the art without departing from the true spirit and scope of the invention.

I claim:

1. A hydrocarbon conversion catalyst comprising a magnesium chromium ferrite with a spinel structure and having the empirical formula $Mg_xCr_yFe_zO_4$ wherein $x$ ranges from about 0.1 to about 3, $y$ ranges from greater than 0 to less than 2 and $z$ ranges from greater than 0 to less than 3 and a surface area of at least about 0.1 m.²/g.

2. A hydrocarbon conversion catalyst in accordance with claim 1 in which $x$ is about 1.0.

3. A hydrocarbon conversion catalyst in accordance with claim 1 wherein $x$ ranges from about 0.1 to about 2.0, $y$ ranges from about 0.1 to about 1.8 and $z$ ranges from about 0.25 to about 1.9.

4. A hydrocarbon conversion catalyst in accordance with claim 1 having a surface area of at least about 1.0 m.²/g.

5. A hydrocarbon conversion catalyst in accordance with claim 4 wherein $x$ ranges from about 0.8 to about 1.3, $y$ ranges from about 0.2 to about 1.5 and $z$ ranges from about 0.5 to about 1.8.

6. A hydrocarbon conversion catalyst in accordance with claim 5 in which $x$ is about 1.0.

7. A hydrocarbon conversion catalyst in accordance with claim 6 in which $y$ is about 1.0 and $z$ is about 1.0.

8. A hydrocarbon conversion catalyst in accordance with claim 3 in which $x$ is about 1.0.

9. A hydrocarbon conversion catalyst in accordance with claim 1 carried on an inert support.

10. A hydrocarbon conversion catalyst consisting essentially of magnesium chromium ferrite compound with a spinel structure and having the formula $Mg_xCr_yFe_zO_4$ wherein $x$ is about 1, $y$ is between about 0.1 and about 1.8, $z$ is between about 0.25 and about 1.9 and the sum of $y+z$ is about 2.0, said catalyst having a surface area of at least about 0.1 m.²/g.

11. A hydrocarbon conversion catalyst in accordance with claim 10 in which $y$ is between about 0.2 and about 1.5, and $z$ is between about 0.5 and about 1.8.

12. A hydrocarbon conversion catalyst in accordance with claim 11 having a surface area of at least about 1.0 m.²/g.

13. A hydrocarbon conversion catalyst in accordance with claim 12 in which $y$ is about 1 and $z$ is about 1.

References Cited

UNITED STATES PATENTS

| | | | |
|---|---|---|---|
| 2,567,140 | 9/1951 | Ashley | 252—468 |
| 3,450,787 | 6/1969 | Kehl | 260—680 |
| 2,891,956 | 6/1959 | Oberlin | 260—290 |

DANIEL E. WYMAN, Primary Examiner

P. M. FRENCH, Assistant Examiner

U.S. Cl. X.R.

83—51

PO-1050
(5/69)

UNITED STATES PATENT OFFICE
CERTIFICATE OF CORRECTION

Patent No. __3,577,354__   Dated __May 4, 1971__

Inventor(s) __William L. Kehl__

It is certified that error appears in the above-identified patent and that said Letters Patent are hereby corrected as shown below:

Column 4, lines 13-21 should read as follows:

| $d(\text{Å})$: | $I/I_o$ |
|---|---|
| 4.83 | 36 |
| 2.96 | 24 |
| 2.52 | 100 |
| 2.41 | 5 |
| 2.09 | 35 |
| 1.705 | 1 |
| 1.605 | 30 |
| 1.475 | 40 |

Signed and sealed this 12th day of June 1973.

(SEAL)
Attest:

EDWARD M. FLETCHER, JR.
Attesting Officer

ROBERT GOTTSCHALK
Commissioner of Patents